Feb. 1, 1927.

C. E. PERRY 1,616,387

RESISTANCE MEASUREMENT

Filed Jan. 4, 1926

Feb. 1, 1927. 1,616,387
C. E. PERRY
RESISTANCE MEASUREMENT
Filed Jan. 4, 1926 5 Sheets-Sheet 2

C. E. Perry
INVENTOR

By: Marks & Clerk
atty

Feb. 1, 1927.

C. E. PERRY 1,616,387

RESISTANCE MEASUREMENT

Filed Jan. 4, 1926     5 Sheets-Sheet 4

C. E. Perry, INVENTOR

By: Marks and Clark, attys

Feb. 1, 1927. 1,616,387
C. E. PERRY
RESISTANCE MEASUREMENT
Filed Jan. 4, 1926    5 Sheets-Sheet 5

C. E. Perry, Inventor
By Marks & Clark, Attys

Patented Feb. 1, 1927.

1,616,387

UNITED STATES PATENT OFFICE.

CHARLES EDWIN PERRY, OF CHISWICK, LONDON, ENGLAND, ASSIGNOR OF ONE-HALF TO EVERSHED AND VIGNOLES, LIMITED, OF LONDON, ENGLAND.

RESISTANCE MEASUREMENT.

Application filed January 4, 1926, Serial No. 79,239, and in Great Britain January 1, 1925.

This invention relates to the measurement of the resistance of electrolytes in particular but it has other applications.

It is especially directed to the provision of a process for the continuous measurement of the resistance of condensates and the like, the need for which is very great.

In steam practice it is extremely important to make sure that leakage of cooling water into the condensate shall not take place for several reasons, for example, tubes become rapidly damaged, the condensate is rendered impure, with resulting disaster to the efficiency of the boilers. For that reason tests are made of the resistance of the condensate from time to time, namely, at intervals of a day, or possibly of a week. This has been effected by the well-known "Dionic" water tester, in which a hand-driven direct current generator supplies current to a sample of the water to be tested contained in a suitable tube, the resistance of the water being measured by an ohmmeter, suitable adjustments or precautions being taken to deal with the effect of temperature changes.

This has resulted in a very large saving of upkeep due to the fact that by a comparatively early indication of leakage or the like the repair cost is low and the loss due to stoppage of the plant or part of the plant for purposes of repair is small.

So great is the rapidity with which leaks may develop that it is found even this method of dealing with the problem leaves much to be desired and the object of the present invention is to provide a continuous recorder enabling the state of the condensate to be ascertained at any time by inspection of the record and therefore leaks or the like to be immediately detected.

I have found that in order to enable an apparatus to be constructed which will lend itself to continuous operation for industrial purposes direct current cannot successfully be used for passing through the electrolyte under test.

On the other hand certain difficulties arise when it is attempted to employ alternating current for measuring instruments of the character in question; in fact I believe it to be essential, or at least highly desirable, for commercial purposes that the measuring instrument, whether it be indicating or recording, should be capable of use with direct current, preferably an instrument of the ohmmeter type, for instance as used in the "Dionic" water tester referred to above.

It has been proposed to measure the resistance or conductivity of electrolytes by the Wheatstone bridge method, direct current being used as the source of supply and this commuted by a rotating commutator before being led to the bridge, indication of equilibrium being shown on a galvanometer, the commuted current from the bridge being rectified to direct current before passing to this galvanometer by means of a commutator similar to the first and mounted on the same shaft.

A galvanometer sufficiently delicate to give the required indication is not suitable for use in practice for the purposes for which this invention is particularly required, neither is a null method such as the Wheatstone bridge readily adaptable for continuous recording.

I have found that I can apply the principle used in that laboratory arrangement, namely, the employment of a commuted direct current or its equivalent as the source of current to pass through the electrolyte under test, and provide an apparatus which can be commercially used for the purpose indicated. The galvanometer is not a suitable instrument for such purposes having regard to the conditions of use and the substitution of an ohmmeter presents several problems because two currents have to be considered, namely, the currents in both the control and deflecting coils. These difficulties I have overcome and I indicate below how an apparatus may be constructed.

It is desirable that the ordinary calibration of the ohmmeter should be available if possible for any method of testing which occasions the use of this instrument. The most simple application of the new method or arrangement to the ohmmeter is one in which the current which has traversed one of the coils only is commuted, but in these circumstances the ordinary calibration of a standard ohmmeter is not correct for this purpose.

By a modification, in what indeed I consider the preferred form, this difficulty has been overcome and the standard instrument with its ordinary calibration can be directly employed for the purposes of this invention.

The invention in brief consists in a method of measuring electrical resistance as referred to below according to which the current passing through the resistance under test is a commuted or alternating current and testing is effected by the mutual reaction of two magnetic coils, at least one of which is fed by a current which after commutation passes through the resistance under test.

The invention also consists in apparatus for carrying out the method of the preceding paragraph including a rotating commutator and an ohmmeter, together preferably with a second rotating commutator, in which case there is a commutator in each circuit of the ohmmeter and the breaks in the circuits at the gaps in the commutators are of equal duration and occur as far as necessary simultaneously so that the effective result is similar to that of the ordinary operation of an ohmmeter as regards calibration.

The invention also consists in the method and apparatus hereinafter described.

Referring to the accompanying drawings:—

Figure 1:
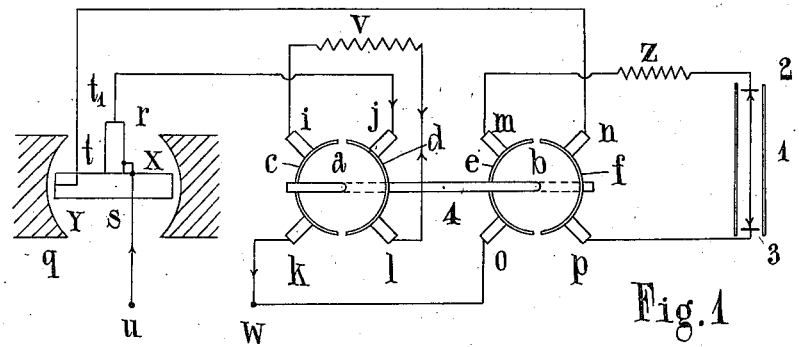
Figure 1 is a diagram representing how the invention may be carried into effect in one form.

In carrying the invention into effect in the form illustrated by way of example diagrammatically in Figure 1, two similar rotating commutators $a$ and $b$, each having two segments, namely $c, d$ and $e, f$ respectively and four brushes $i, j, k, l,$ and $m, n, o, p$, respectively, are employed in conjunction with a standard ohmmeter indicated by $q$ with a control or pressure coil $r$ and a deflecting or current coil $s$. One end namely $t$, of the control or pressure coil $r$ is connected to one pole of a direct current supply indicated by $u$ and the other end $t_1$ of the winding of the control or pressure coil $r$ is connected through the brush $j$, one of the segments $c, d$, according to the instantaneous position of the commutator, and brush $i$ or brush $l$ to the resistance $v$ and thence to the other terminal of the direct current supply indicated by $w$.

The deflecting or current coil of the moving system, namely $s$, has one end of the winding, namely $x$, connected to the terminal $u$ and the other end of the winding, namely $y$, is connected through the commutator $b$, a resistance $z$ and the electrolyte under test indicated by the container 1 and the electrodes 2 and 3 to the terminal $w$.

The commutators $a$ and $b$ are mounted on the shaft 4 and rotated at such a speed as to give reversals at the rate of, say, about 50 per second.

If the inertia and damping of the moving parts of the ohmmeter be sufficiently high as is the case with ordinary commerical ohmmeter movements, particularly recording ohmmeters, no special care need be taken to ensure the breaks in the circuits at the gaps occurring simultaneously.

In operation, assuming the commutators to be rotating in a clockwise direction and that $u$ is the positive terminal of the direct current supply, current flows through the electrolyte as follows, taking first the commutators in the position in which they are shown in the drawings:—

From $u$ through the coil $s$ by terminals $x, y$ the commutators $b$ by brush $n$, segment $f$ and brush $p$, through the electrolyte in the direction 3 to 2, resistance $z$, brush $m$, segment $e$, brush $o$ and negative terminal $w$.

During this time current flows through the pressure coil $r$ of the ohmmeter from terminal $u$ by way of the coil terminals $t$, and $t_1$, commutator $a$ through brush $j$, segment $d$, brush $l$, resistance $v$, brush $i$, segment $c$ and brush $k$ to terminal $w$.

This may be summarized by saying that the current flows (a) up through the electrolyte from 3 to 2, (b) from $x$ to $y$ in coil $s$ and (c) from $t$ to $t_1$ in coil $r$.

Assume now that the commutators have rotated through an angle of 90° in a clockwise direction. The current in the deflecting or current circuit passes from $u$ through coil $s$ in the direction $x$ to $y$, commutator $b$ by brush $n$, segment $e$, brush $m$, resistance $z$, electrolyte in 1 from 2 to 3, brush $p$, segment $f$ and brush $o$ to terminal $w$. During the same time as regards the pressure or control coil the current passes from $u$ through the control coil $r$ in the direction $t$ to $t_1$, commutator $a$, by brush $j$, segment $c$, brush $i$, resistance $v$, brush $l$, segment $d$ and brush $k$ to the terminal $w$. In this phase therefore the current passes ($a$) down through the eltcrolyte, ($b$) in the current coil in the direction $x$ to $y$, and ($c$) in the pressure coil in the direction $t$ to $t_1$.

Thus rapidly reversed currents are passed through the electrolyte but unidirectional currents flow through the coils of the ohmmeter.

By thus using two similar commutators, one in the control circuit and the other in the deflecting circuit, the final position of the ohmmeter needle will be the same as though uninterrupted direct currents were passing through the coils. The moving system will have slightly less working force than with uninterrupted direct current, the amount of diminution depending on the relative length of the make and break in the commutator segments.

The instrument still behaves substantially as a true ohmmeter in that it is independent over wide limits of the voltage of the direct current supply. Further, the speed of the commutators or the frequency of the reversals can be varied over wide limits.

In addition the advantages of the employment of alternating current or its equivalent, namely, commuted current, for passing through the resistance under test and direct current for use in the measuring instrument, are obtained.

Again, the apparatus is not one which is limited to laboratory uses, nor one which will only give satisfactory results in the hands of skilled operators, the advantages of alternating current testing and direct current indicating being secured in an industrial manner.

The ohmmeter referred to above may be of any suitable kind, preferably a recording ohmmeter, the invention having originally been arrived at through seeking to apply such an instrument for the purposes mentioned.

The invention is however not limited to this use but lends itself to incorporation in other forms and for use for other purposes. Thus a standard indicating ohmmeter may be used and this may be combined in one case with a generator as in the well-known "Megger" insulation testing sets.

I have devised an arrangement in which the ohmmeter, hand-driven generator and commutators form one unit which also preferably includes all the resistances required except that to be tested. According to this construction the commutators are mounted on the shaft of the hand generator or an extension thereof and the various parts are electrically connected as required according to the arrangement set out above.

Figure 2:
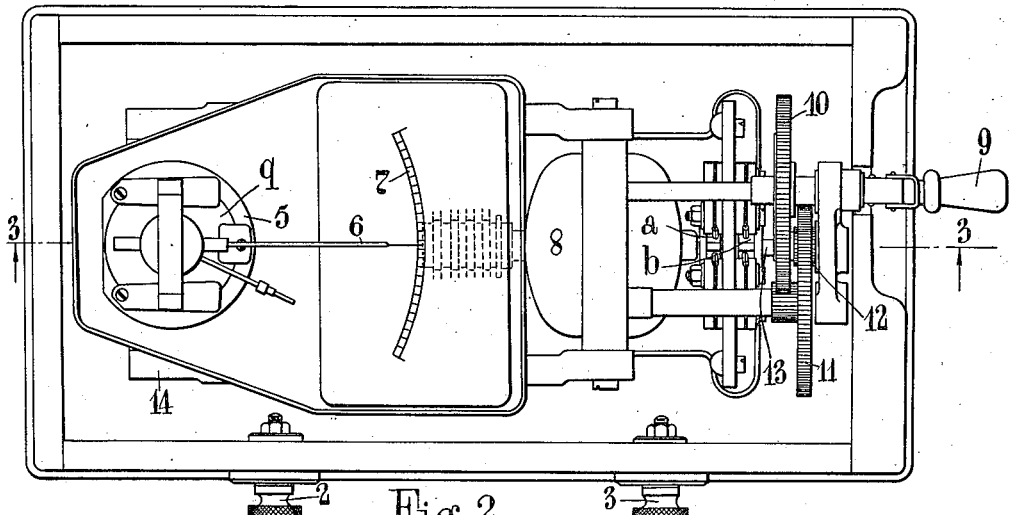
Figure 2 is a plan.
Figure 3:
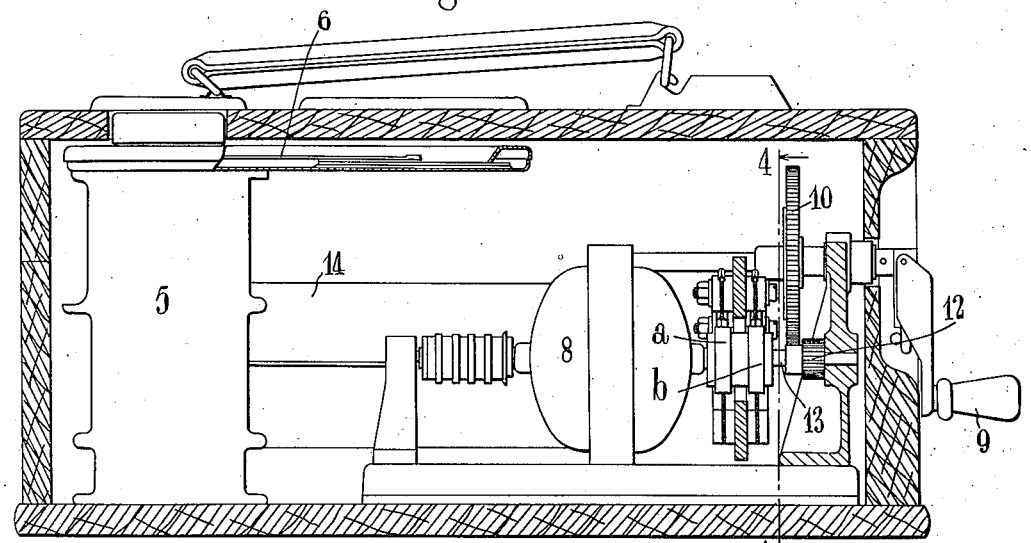
Figure 3 is a sectional elevation on the line 3—3 of Figure 2 looking in the direction of the arrows of one construction according to the invention with hand drive and self-contained generator.
Figure 4:
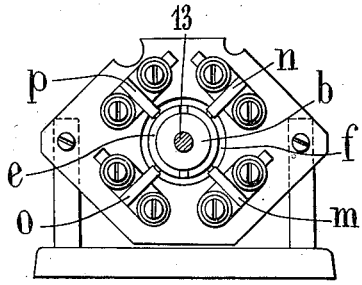
Figure 4 is a cross-section of part of the arrangement on the line 4—4 of Figure 3 looking in the direction of the arrows.

An arrangement of this kind is illustrated in Figures 2, 3 and 4. In this case the ohmmeter $q$ is contained within the metal case 5, the pointer 6 indicating on a dial 7. The generator armature 8 is driven from the handle 9 through a train of gear wheels 10, 11, 12. The armature shaft 13 carries the commutators indicated as before by the reference letters $a$ and $b$ against which bear the appropriate brushes $i$ to $p$. The magnetic field for the ohmmeter $m$ and for the generator armature 8 is supplied by permanent magnets 14. If desired the necessary resistances, not shown, may be mounted in the same case as the generator and ohmmeter.

Figure 5:
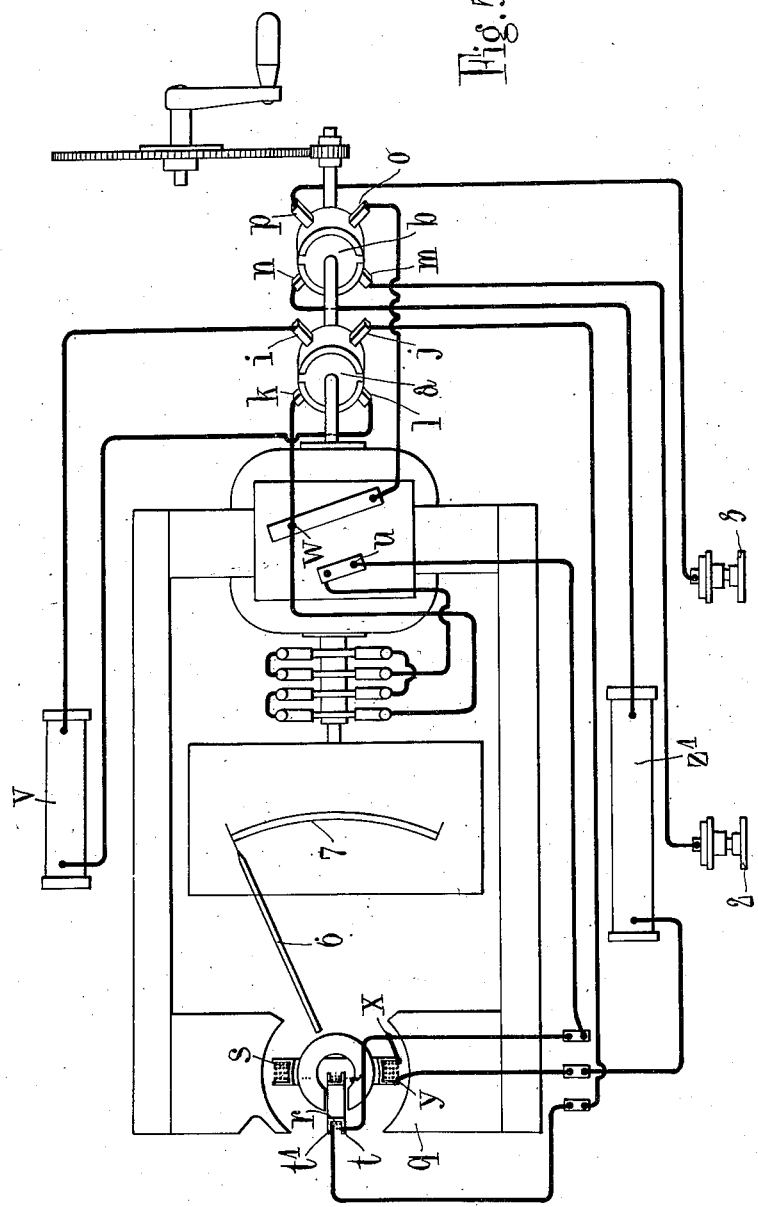
Figure 5 illustrates the electrical connections of the arrangement shown in Figures 2, 3 and 4.

The connections of this apparatus are shown in Figure 5, the circuits being lettered with the same reference letters as those of Figure 1, except the resistance $z$ being placed in an alternative position is marked $z_1$.

The generator with its associated commutators or reversing switches may be power driven from either an external source of mechanical power or a motor may be enclosed in the same case and driven from an outside source of current. Power driving is the method I prefer to adapt and indeed is the only suitable method for continuous action.

Figure 6:
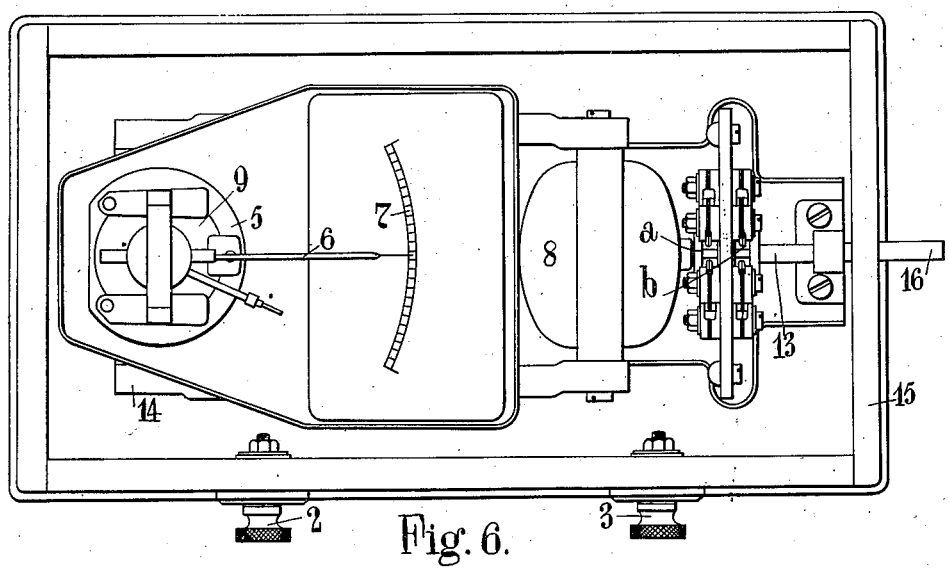
Figure 6 shows in plan a modified arrangement adapted for driving by an external source of mechanical power.

An arrangement of this kind adapted for an external source of power is shown in Figure 6. This is similar to the arrangement of Figures 2 to 4 with the exception that the gear train 10, 11, 12 is omitted and the generator shaft 13 projects directly through the casing of the apparatus 15, leaving a part 16 to which power can be applied in any suitable way.

Figure 7:
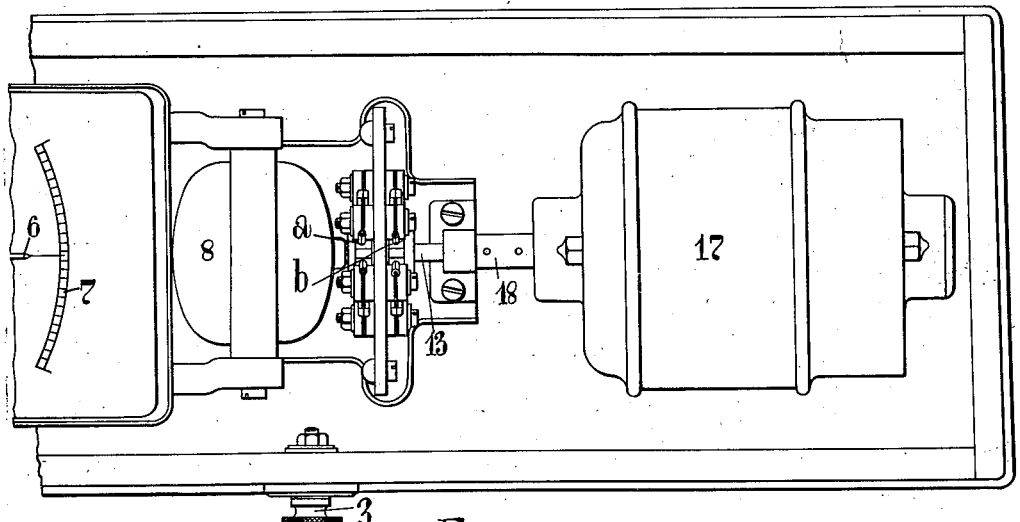
Figure 7 shows in plan a further modification in which an electric motor drive is mounted in the same case as the generator and ohmmeter.

A modification in which the motor is enclosed in the same case as the generator and ohmmeter is illustrated in Figure 7. The motor represented by 17 is directly coupled to the generator shaft 13 by way of a coupling 18 and current is supplied to it through suitable leads and terminals, not shown.

A power-driven generator with its commutator or reversing switch on the same spindle may be made as one unit, an ohmmeter as a second unit and a "Dionic" or like water tester tube as a third unit for purposes of industrially effecting indication or record of changes of conductivity or resistivity of condensate water or the like.

Figure 8:
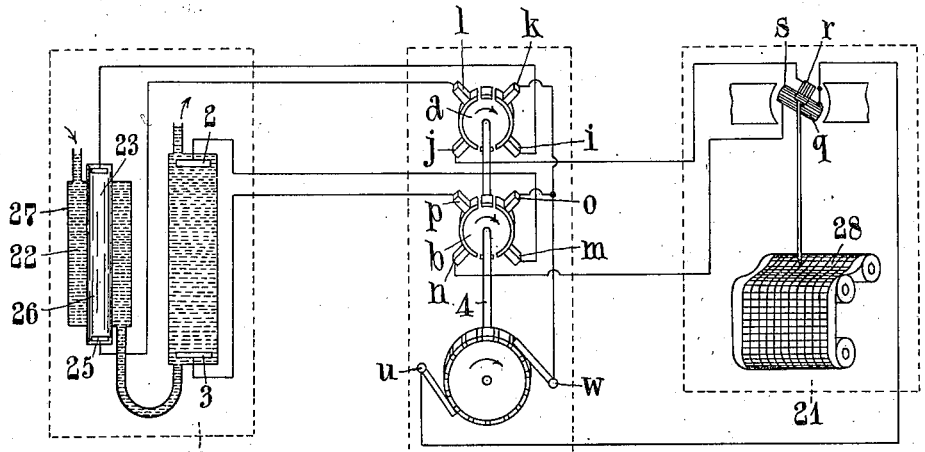
Figure 8 is a diagram showing the general arrangement of a recording water testing apparatus.

A diagrammatic illustration of one arrangement of this character partly in the form of a sketch is shown in Figure 8 in which the water testing unit as a whole is designated by 19, the current supply and reversing apparatus by 20 and the recording ohmmeter mechanism by 21. As far as possible the parts have been lettered to agree with Figure 1.

As regards the water testing apparatus the water to be tested is caused to flow continuously through the tube 1 containing electrodes 2 and 3 fixed at a suitable distance apart, the effect of temperature variation being compensated by means of a special jacketed apparatus 22. In this a resistance 23 formed by inserting electrodes 24 and 25 in a tube 26 containing a solution having the same temperature coefficient as the liquid under test is connected electrically in series with the controlling coil of the recording ohmmeter. The liquid to be tested flows in a cylindrical jacket 27 surrounding the tube 26 and the variations in the resistance of the liquid under test caused by variation of its temperature are accompanied by proportionate variations in the resistance of the control circuit of the ohmmeter $q$. The movements of the ohmmeter are recorded on the chart 28.

Temperature compensation can also be applied in the case of metallic or like resistances if desired.

An external source of direct current supply may be used to operate the ohmmeter, the commutators or reversing switches being contained in the same case as the ohmmeter and being driven either by hand or by a small motor enclosed in the same case or by external power.

Figure 9:
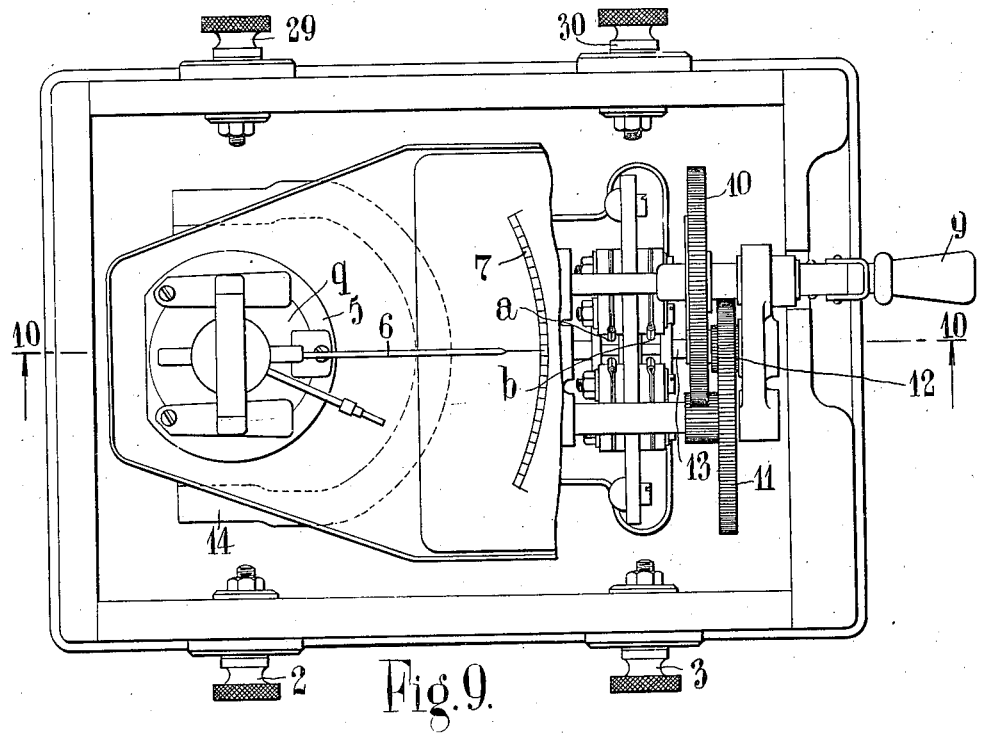
Figure 9 shows a form of the invention arranged for hand driving and for the supply of current from an external source.
Figure 10:
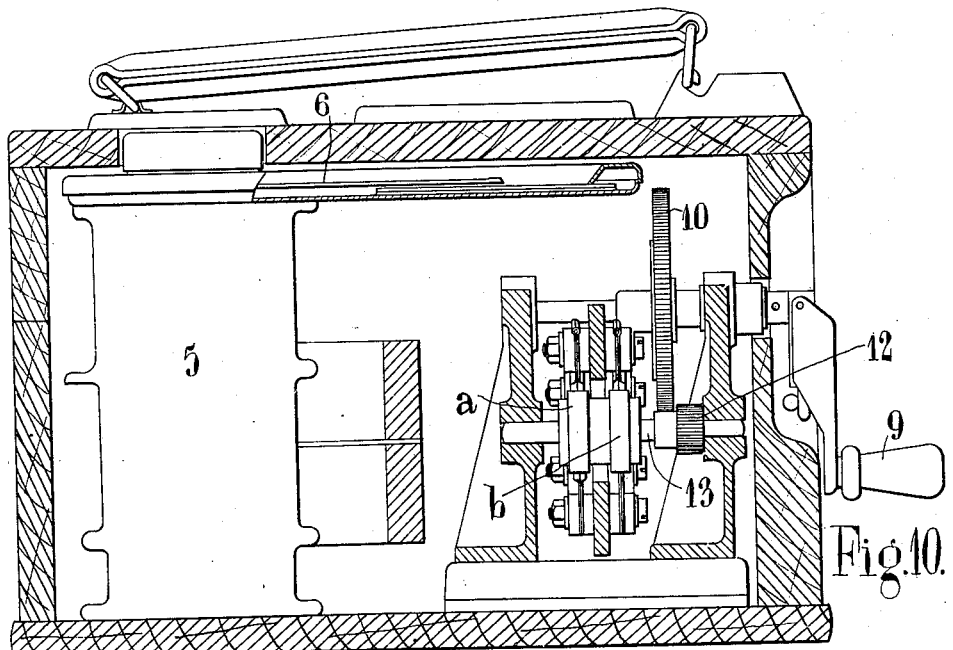
Figure 10 is a cross-sectional elevation on the line 10—10 of Figure 9 looking in the direction of the arrows.

An arrangement of this kind applied for hand driving is shown in Figures 9 and 10. This form is substantially similar to that of Figures 2 to 4, with the exception that the generator armature 8 and its associated parts are omitted and terminals 29 and 30 provided for the supply of direct current from any suitable external source, not shown.

This arrangement can be adapted for driving by external mechanical power on the lines of the form shown in Figure 6 or a motor can be contained in the same case on the lines of the form shown in Figure 7.

The invention has been described with reference to the measurement of the resistance of liquid conductors, but it may be applied for other purposes where polarization is set up by direct current testing as, for instance, for the measurement of earth resistance where both polarization and also leakage currents tend to vitiate measurements made by direct current methods and, in fact, for any case in which alternating current would commonly or preferably be employed.

Frequently resistances to be measured are accompanied either by inductance or by capacity and in some cases these factors predominate so that in the limit there may be practically no resistance but mainly capacity or inductance. The apparatus may still be employed for measurement purposes, values of resistance being interpreted in terms of inductance or of capacity on suitably marked scales to enable which to be done the generator should be driven at a constant speed.

The arrangement shown in Figure 1 is suitable for earth and plate resistance testing, the connections to the earth and plate corresponding to the electrodes 2 and 3.

One important advance made by the new method is that it enables comparatively large testing currents to be used without producing substantial electrolysis which is of especial importance where recording instruments are used, the employment of large currents being also preferable for other reasons in certain circumstances.

The commutator in the pressure or control circuit of the ohmmeter may be omitted but in that case the instrument will require to be calibrated to meet the special conditions.

Where reference is made to a commuted current in this specification or in the claims attached thereto this phrase includes an alternating current and vice versa.

Having now described my invention what I claim as new and desire to secure by Letters Patent is:—

1. The method of measuring the resistance of a liquid comprising passing a direct current through the deflecting coil of an ohmmeter, commuting said current, passing the commutated current through the liquid, passing a current from the same source through the control coil of said ohmmeter and interrupting said second current in substantial synchronism to the commuting of said first current.

2. The method of measuring the resistance of a liquid comprising passing a direct current through a coil, commuting said current, passing said commuted current through the liquid, passing a current through a second coil, interrupting said current at the same frequency as the first current is commutated, and noting the mutual reaction of the two coils.

3. Apparatus for testing the resistance of a liquid including in combination, a two coil ohmmeter, a commutator, an interrupter and a source of direct current, said current passing through one coil of said ohmmeter, said commutator and liquid in series whereby the current is periodically reversed in said liquid, current from said source also passing through the other coil of said ohmmeter and said interrupter to be interrupted in synchronism with the commutated current.

4. Apparatus for testing the resistance of a liquid including in combination a two coil ohmmeter, a pair of commutators on the same shaft and a source of direct current, said current passing through one coil of said ohmmeter, one commutator and the liquid whereby the current is periodically reversed in said liquid, current from said source in a parallel circuit passing through said other coil and said second commutator, said commutators being arranged so that the breaks in the two circuits are of substantially equal duration and occur substantially simultaneously.

5. The combination claimed in claim 4 together with means for compensating for variations in the temperature of the liquid.

In testimony whereof I have signed my name to this specification.

CHARLES EDWIN PERRY.